Aug. 11, 1953 S. B. ECKERT 2,648,228
INTERNAL-COMBUSTION ENGINE
Filed Jan. 18, 1947 9 Sheets-Sheet 1
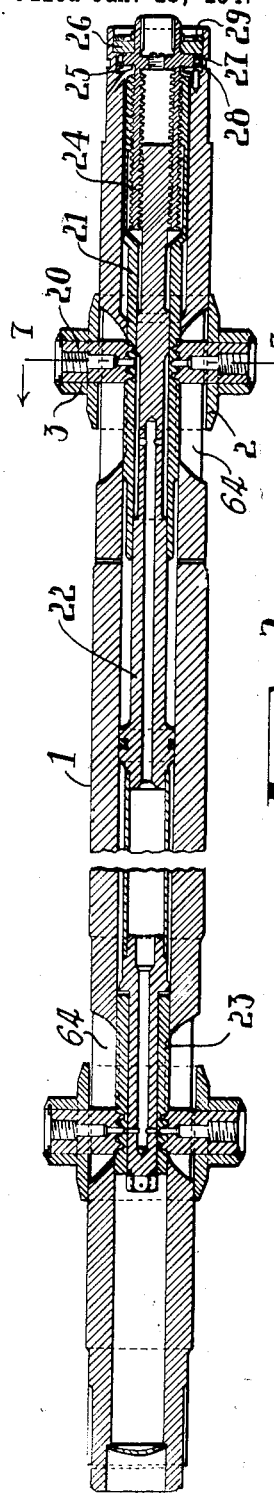
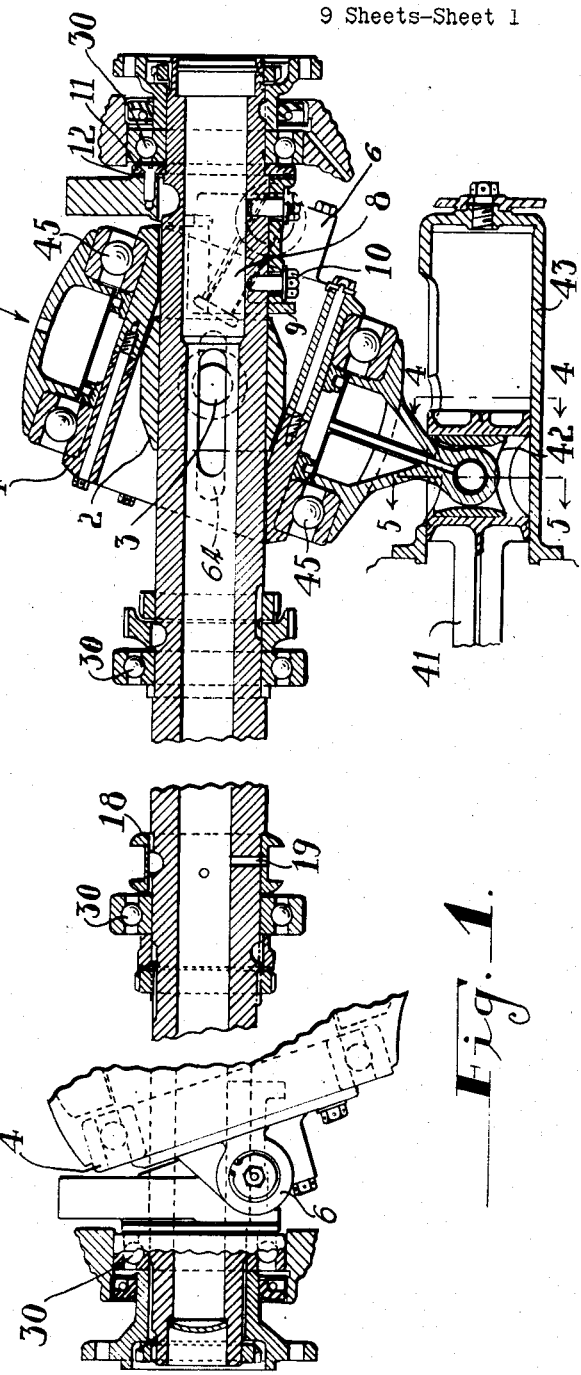
INVENTOR.
Samuel B. Eckert
BY
ATTORNEYS Aug. 11, 1953  S. B. ECKERT  2,648,228
INTERNAL-COMBUSTION ENGINE
Filed Jan. 18, 1947  9 Sheets-Sheet 4

INVENTOR.
Samuel B. Eckert
BY
Busser and Harding
ATTORNEYS

Aug. 11, 1953 S. B. ECKERT 2,648,228
INTERNAL-COMBUSTION ENGINE
Filed Jan. 18, 1947 9 Sheets-Sheet 5

INVENTOR.
Samuel B. Eckert
BY
Busser and Harding
ATTORNEYS

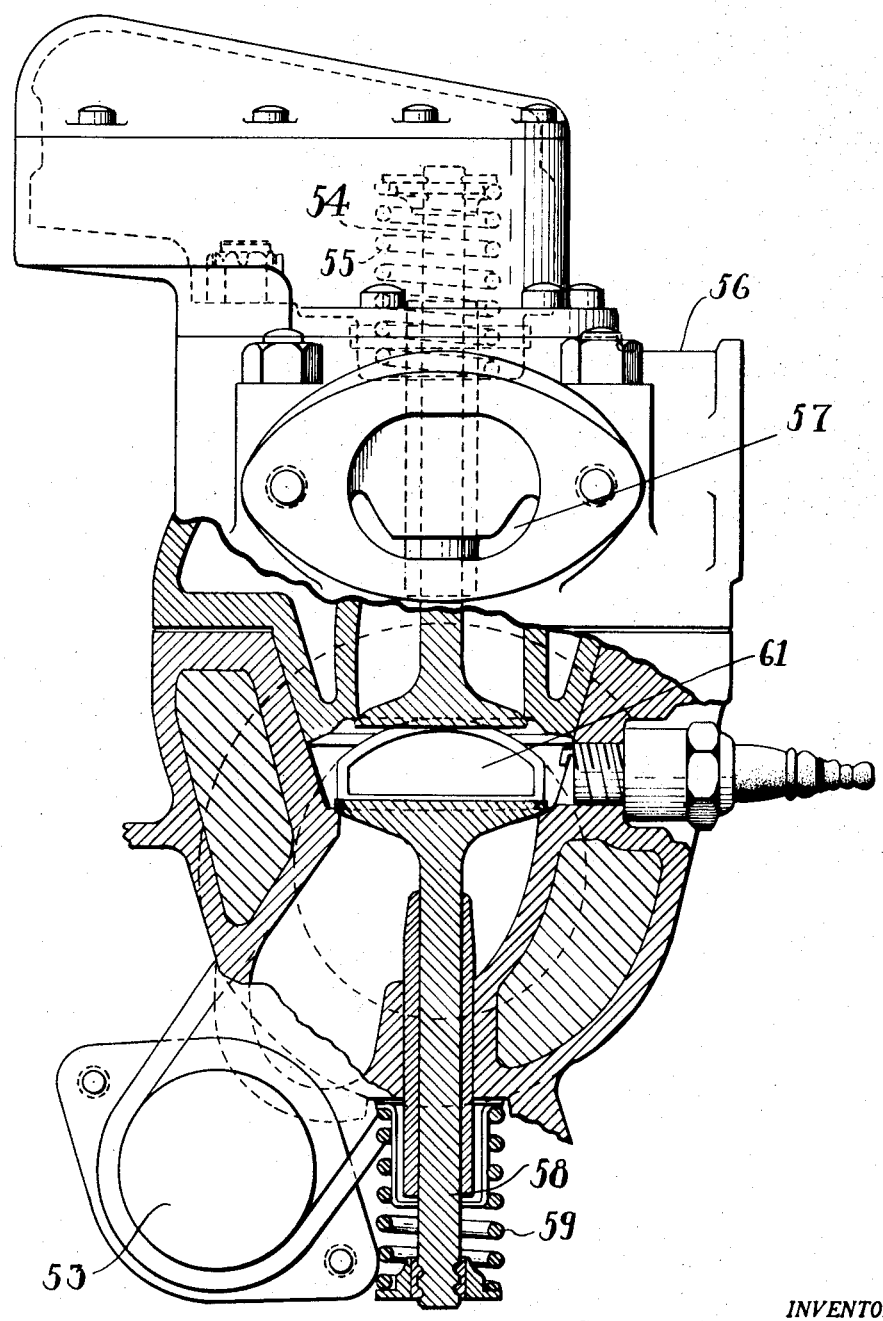

INVENTOR.
Samuel B. Eckert

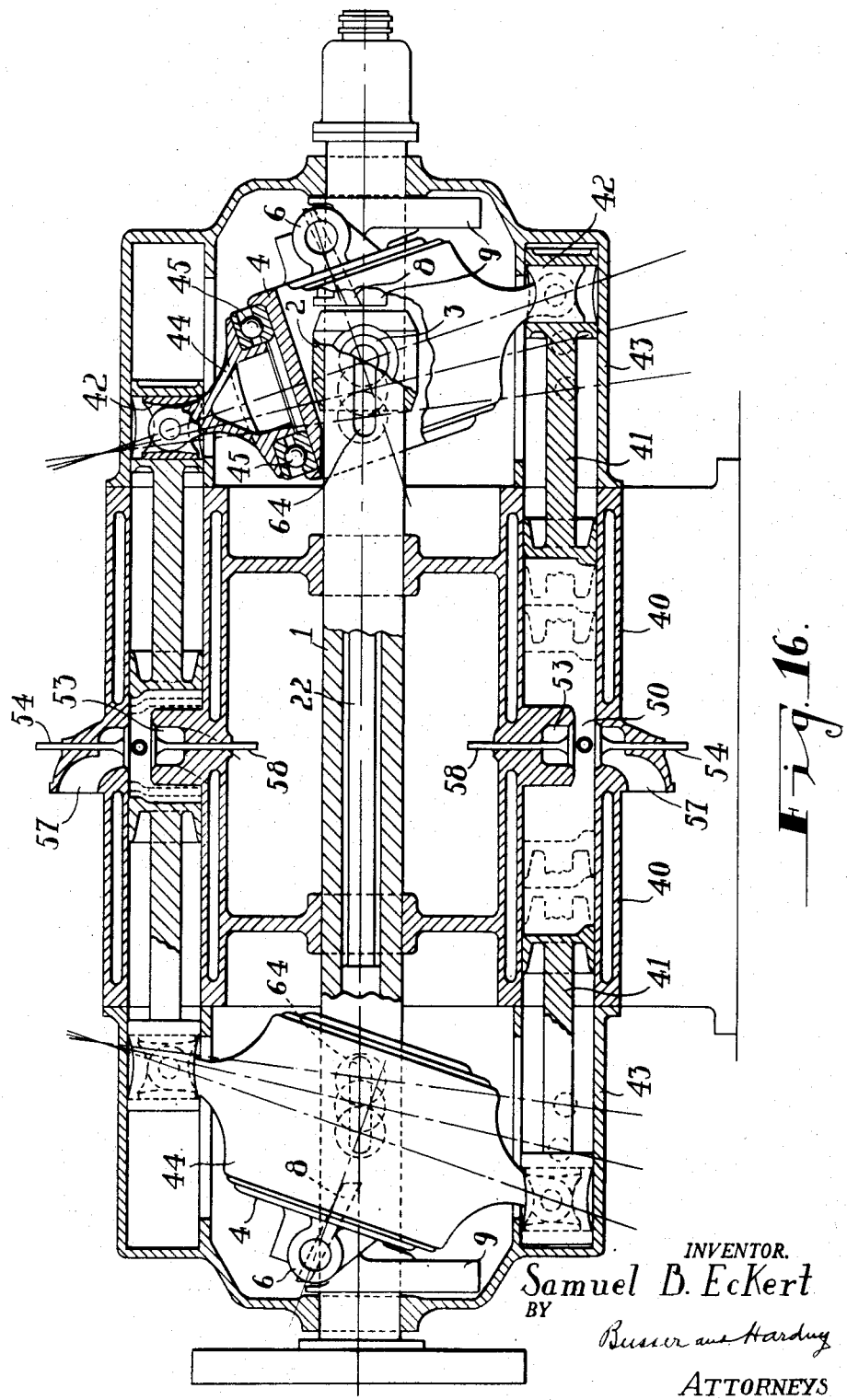

de Aug. 11, 1953 — 2,648,228

UNITED STATES PATENT OFFICE 2,648,228

INTERNAL-COMBUSTION ENGINE

Samuel B. Eckert, Haverford, Pa.

Application January 18, 1947, Serial No. 722,876

4 Claims. (Cl. 74—60)

In the conventional type of gasoline internal combustion engine, the variation in power output is accomplished by regulating the amount of charge introduced into the cylinders. This regulation is accomplished through restricting the inlet passage through which the explosive mixture is carried from the carburetor to the cylinder by the introduction of a butterfly valve. The opening and closing of this valve regulates the size of charge of explosive mixture that is taken into the cylinder. Since the cubic displacement of the engine cylinders remains unchanged, the introduction of a reduced charge into the cylinders results in the pressure to which the charge is compressed at top of piston stroke being proportionately less than had the full charge been admitted.

Thus, should the butterfly valve be closed sufficiently to admit only ½ the full charge the final compression would be only ½ that resulting when full charge is admitted; e. g., when compression ratio (that is, the ratio of the cylinder space above the piston at the bottom of its stroke to the space above the piston at the top of its stroke) is 6 to 1, the effect of taking in a ½ charge would be equivalent to operating an engine of 3 to 1 compression ratio, and when only ⅓ of the charge is taken into the cylinder it would be equivalent to operating an engine of only 2 to 1 compression ratio.

Dynamometer tests have shown that the thermal efficiency of an engine having 2 to 1 compression ratio is about 13%, whereas the thermal efficiency of an engine operating at 6 to 1 compression ratio is approximately 30%; in other words, 2⅓ times that of the engine operating on ⅓ cylinder charge.

Since the average pleasure car operates most of the time at an average of about ⅓ maximum load, the engine during most of its operation is consuming 2⅓ times the fuel that should be required were it possible to operate at all times at a 6 to 1 compression ratio.

An engine embodying my invention attains this aim through controlling the charge taken into the engine by varying the length of piston stroke and thus varying the size of charge taken into cylinder; the piston travel taking place in the cylinder so as to bring the top of the stroke to the point that will produce with a reduced charge the same compression that would have resulted had full piston travel taken place and the full charge taken into the cylinder and compressed. In this way maximum efficiency is assured at all loads.

In an engine embodying my invention the conventional throttle valve is not operated during normal operation, but is retained and utilized only for very low power output and idling purposes. The wobbler mechanism shown in the accompanying drawings and hereinafter described is designed and adapted to permit varying the stroke and varying the combustion space in proportion to maintain constant compression ratio between the limits of 40% and 100% of the maximum stroke. Below 40% of the stroke, power is controlled by means of a conventional carburetor throttle valve.

The variation in stroke is accomplished by changing the angle of the wobbler hub in respect to the shaft, from a minimum of 71° to a maximum of 82°—31' (or 19° and 7°—29' in respect to a vertical centerline) which provides a maximum stroke of 4.5" and a minimum stroke of 1.8". The constant compression ratio of 6.5 to 1, is obtained by sliding the wobbler hub along the shaft toward or away from the combustion chamber in the proper proportion to the variation in stroke of the piston.

The above variations in angles of wobbler hub, piston stroke length and compression ratio should be understood as features characterizing the engine which I have constructed and not as values which must necessarily be adhered to in order to attain the object of the invention.

It is possible to construct a constant compression engine, of simpler design than that herein shown and described, which would comprise a single bank of cylinders and pistons and a single wobbler mechanism similar in design to each of the two sets of pistons and two sets of wobbler mechanisms herein disclosed. In such case a conventional combustion chamber, of the valve-in-head type, would be satisfactory. However, such an engine would be difficult to properly balance, thrust loads on the shaft would be troublesome to handle, and the loads on the wobbler bearings would tend to be excessive.

To overcome the problems of balance and bearing loads, the engine has been designed with a wobbler on each end of the main shaft, and with opposed pistons having a common combustion chamber between them. This construction neutralizes piston inertia forces and halves the explosion force on the wobbler bearings. Furthermore, the inherent dynamic "out of balance" of one wobbler neutralizes that of the other, resulting in complete dynamic balance of the main shaft without resort to counterweights.

A preferred embodiment of my invention is shown in the accompanying drawings, in which:

Fig. 1 is a longitudinal section through the main shaft of the engine, the wobbler hubs, the star plate and the latter's connection to one of the pistons.

Fig. 2 is a longitudinal section through the main shaft and the adjustable control rods and master screw.

Fig. 12 is a section taken on the line 12—12 of Fig. 14.

Fig. 16 is a cross-sectional view of the entire engine, showing, in somewhat simplified form, all the principal elements.

Figure 6:
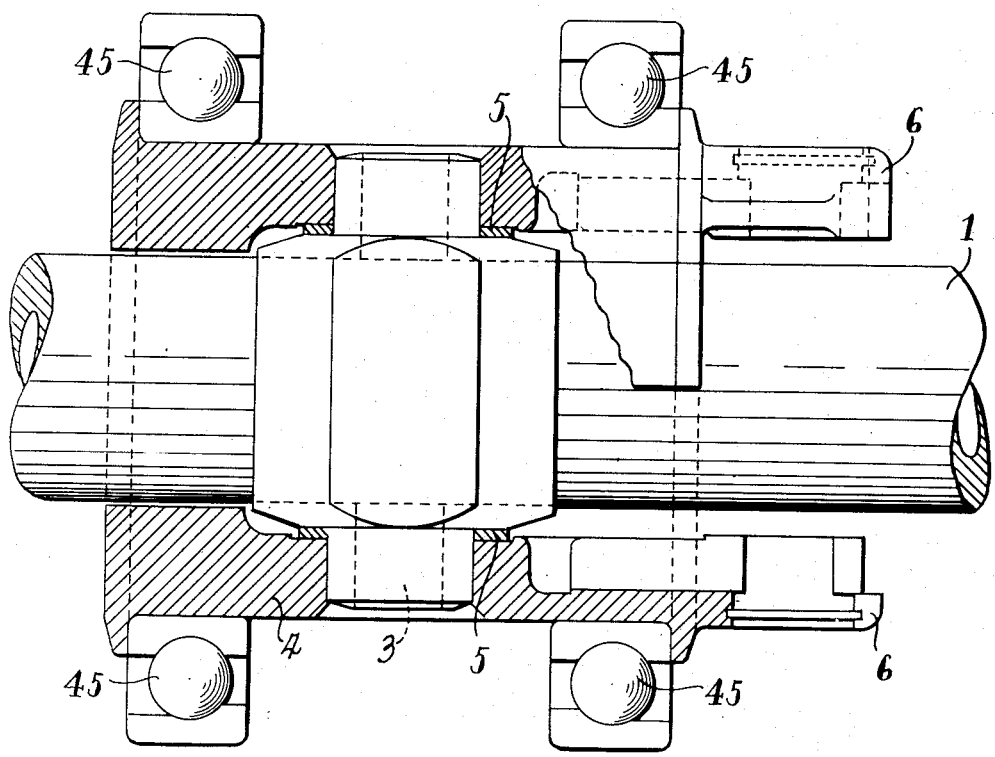
Fig. 6 is a view, partly in cross-section, of the engine shaft and one of the wobbler hubs, looking in the direction of the arrow, Fig. 1.
Figure 7:
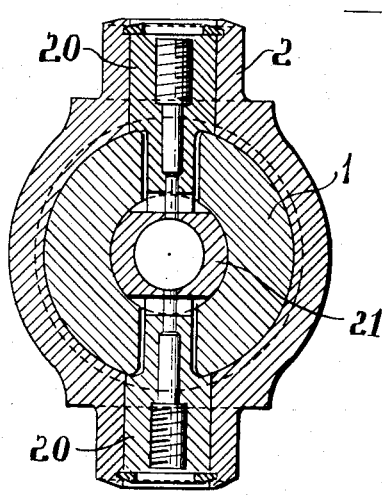
Fig. 7 is an enlarged cross-section on the line 7—7 of Fig. 2.
Figure 8:
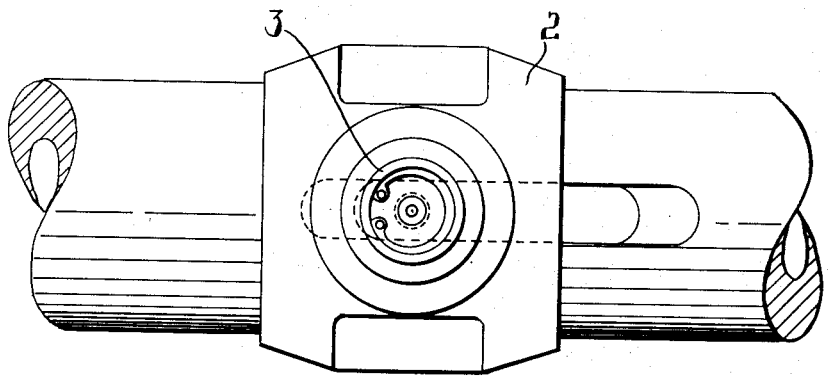
Fig. 8 is a side elevation of the wobbler hub sleeve.

Referring mainly to Figs. 1 and 2 and 16: Each of the two wobbler hubs 4 is mounted on trunnions 3 that project from each side of a sleeve 2 slidable on the engine shaft 1. Thrust washers 5 (see Fig. 6) hold the hub 4 concentric with the shaft 1.

Figure 3:
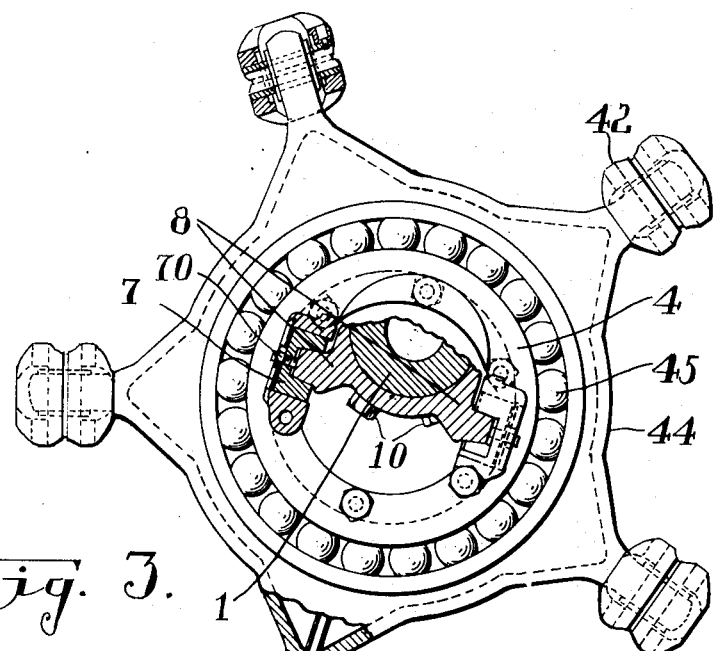
Fig. 3 is a cross-section through one of the wobbler hubs and its corresponding star plate.
Figures 4, 5:
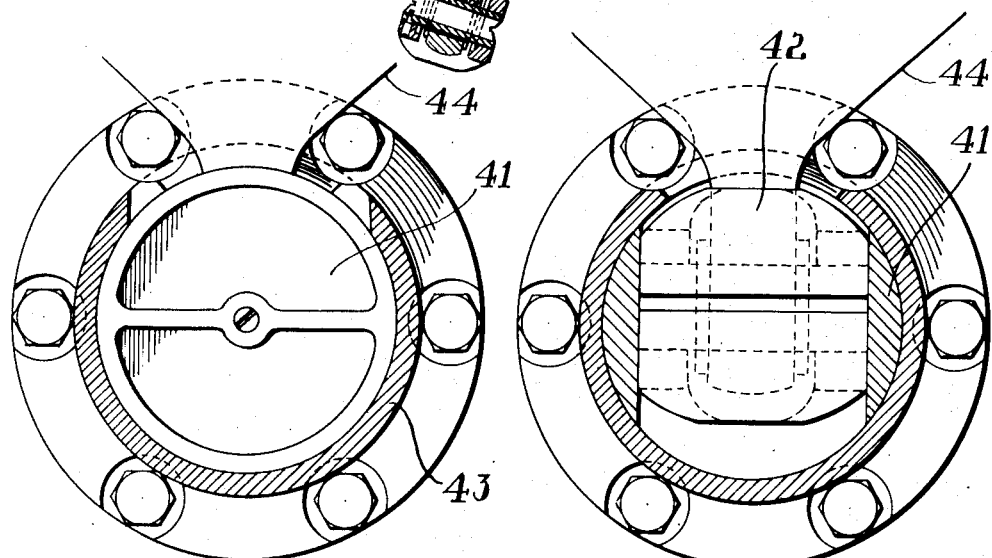
Fig. 4 is an enlarged cross-section on the line 4—4 of Fig. 1.
Fig. 5 is an enlarged cross-section on the line 5—5 of Fig. 1.
Figure 9:
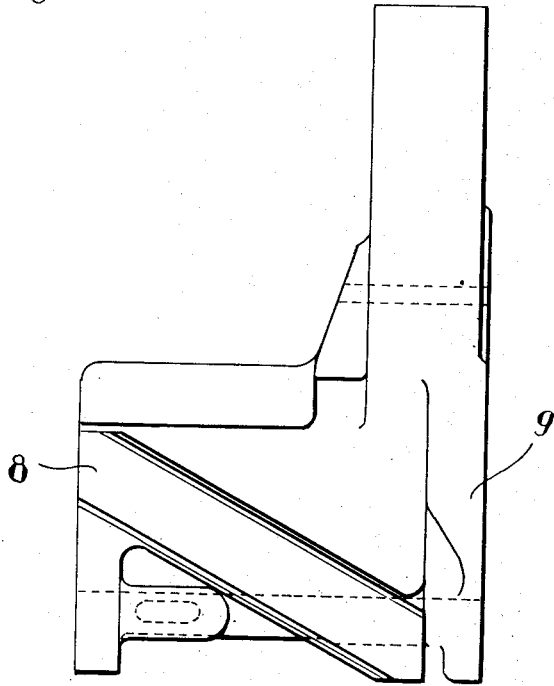
Fig. 9 is a side elevation of the wobbler hub saddle.
Figure 10:
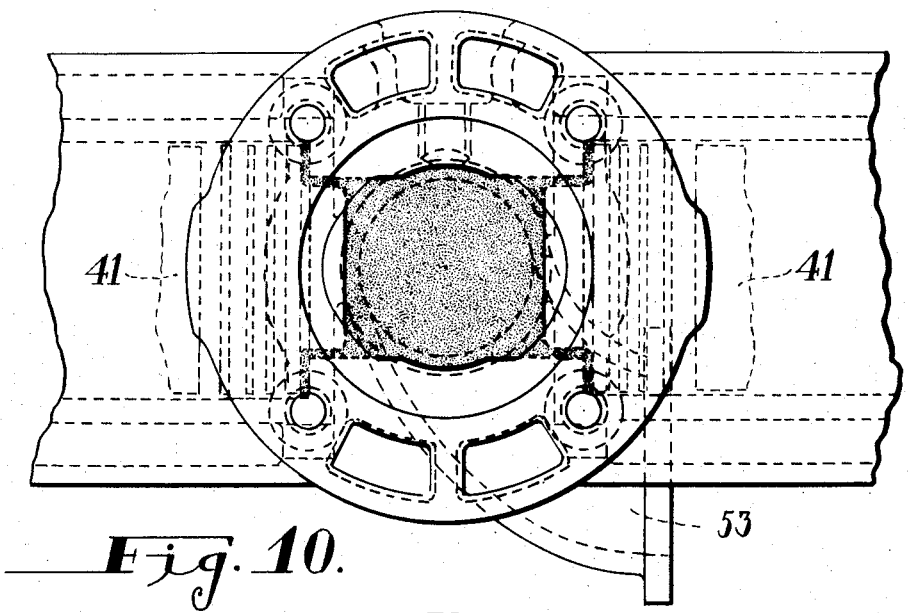
Fig. 10 is a plan view section, taken on the line 10—10 of Fig. 14, showing the shape of the combustion chamber when the piston is at the end of its instroke after the wobbler plate has been adjusted to allow the piston to have only its minimum length of stroke, the volume of the combustion chamber being at its minimum.
Figure 11:
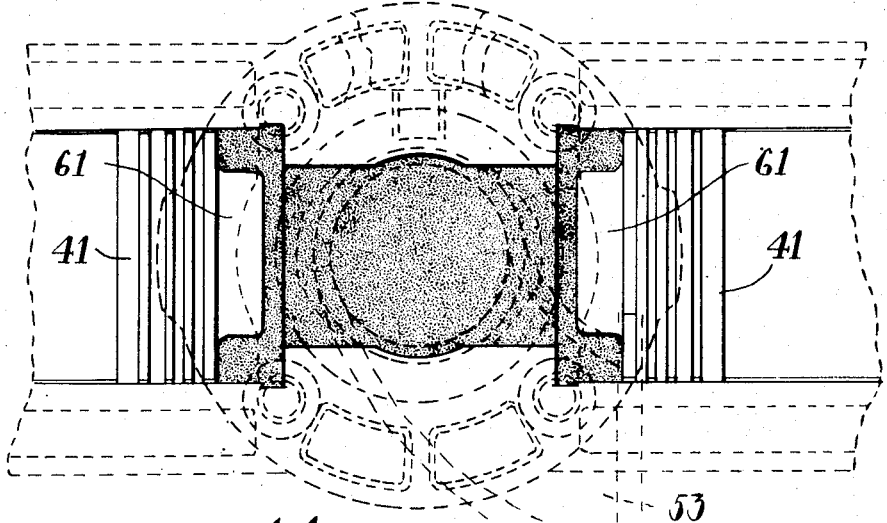
Fig. 11 is a plan view section, taken on the line 11—11 of Fig. 15, showing the shape of the combustion chamber when the piston is at the end of its instroke after the wobbler plate has been adjusted to allow the piston to have its maximum length of stroke, the volume of the combustion chamber being at its maximum.

The outer rim of each wobbler hub 4 is provided with two arms 6 located on opposite sides of the shaft 1. These arms 6 (see Fig. 6) contain sliding blocks 7 (see Fig. 3) that engage sloping guide rails 8 (see also Fig. 9) located on opposite sides of the guide saddle 9, which is secured to the shaft 1 by means of cap screws 10 and positioned fore and aft on the shaft by means of a collar 11 and shims 12. By means of screws 70 the fit of the blocks 7 in the guides 8 may be adjusted.

The wobbler hubs are adjustably movable along the shaft by means of pins 20, carried by the sleeves 2 and extending through slots in the shaft and engaging, respectively, control rods 21 and 22 slidable within the shaft 1. These rods are in threaded engagement with a master screw 24 as hereinafter described, which may be operated by any suitable means (not shown), such as an electric or hydraulic motor. The rear end of control rod 22 is provided with an adjustable sleeve 23 to allow varying the length of the rod at assembly, in order to properly locate the pistons relative to the combustion chamber.

A master screw 24 is provided with a right hand internal thread and a left hand external thread engaging respectively an external thread on the rod 22 and an internal thread on the rod 21. The master screw 24 is positioned in the shaft 1 by means of bronze thrust washers 25 and 26, a spacer oil seal 27 and shims 28, which are in turn held firmly in place by means of a bevelled snap ring 29.

Removal of the four pins 20 through holes (not shown) provided in the nose and rear case as well as in the wobbler hubs 4 and removal of the snap ring 29 allow the entire screw and rod mechanism to be pulled out of the front end of the shaft 1 for service and inspection. Removal of the pins 20 also allows removal of the wobbler hubs 4 without disturbing the screw mechanism.

It will be understood that by turning the master screw 24 in one direction or the other, the control rods 22 and 23 are caused to move in opposite directions, thereby effecting movement in opposite directions of the two wobbler hubs 4. If such hubs are moved toward one another the angle of the hubs relative to the shaft is shifted toward the minimum (e. g. 7°—29'), while if the hubs are moved away from one another, the angle of the hubs relative to the shaft is shifted toward the maximum (e. g. 19°).

While the guide saddle 9 is shown as secured to the shaft 1 so that the turning effort of the wobbler hub is transferred to the shaft through the guide saddle, it is possible to transfer the rotative force to the shaft through the pins 20, which, as above described, extend through slots in the shaft. In such case, the guide saddle 9 may be left free to rotate but constrained from fore and aft movement on the shaft by the collar 11.

In the central part of Fig. 1 are shown the four shaft bearings 30. Oil is fed to the shaft 1 through the oil annulus 18 and holes 19 in the shaft wall. Thence the oil is fed, through holes drilled in the control rods, to the pins 20, which conduct the oil into the wobbler hubs 4.

In the embodiment of the invention shown there are five pairs of cylinders 40 (it being understood that this particular number of cylinders is merely illustrative), the two aligning cylinders of each pair being spaced apart by a central combustion chamber 50. The five cylinders at each side of the central combustion chambers are arranged concentrically around the shaft 1. Working in each cylinder is a piston 41. The pistons carry cross-heads 42 slidable in guides 43 and pivotally connected with the arms of a star plate 44 mounted on one of the revolving wobbler hubs 4 by means of ball-bearings 45.

It will be understood that as the pistons 41 reciprocate the wobbler hubs 4 are rotated and impart rotation to the engine shaft. It will also be understood that the length of stroke of the piston is determined by the degree of adjusted angularity of the wobbler hub to the axis of the shaft.

The above construction is not well adapted to the use of a conventional combustion chamber. From a commercial viewpoint it is desirable, and probably necessary, to provide a special type of combustion chamber.

Owing to the specified variable stroke and constant compression features, valves, capable of handling the maximum displacement of the engine, are installed in a small combustion chamber suitable for the minimum displacement of the engine.

The combustion chamber problem is somewhat similar to that now experienced by L head engine builders, in the development of "high compression" cylinder heads. At compression ratios above 8 to 1 the combustion chamber space of L head type engines is too small to permit proper functioning of the valves, and the opening between the intake valve port and the cylinder, known as the "transfer passage," is too small to permit free flow of gases in and out of the cylinder. Valve-in-head engines are not subject to either of these limitations, as their valves operate in, and open directly into the cylinder. F head engines, in which opposed valves are located in a pocket on one side of the combustion chamber, are capable of handling somewhat higher compression ratios than the L type owing to the fact that both valves operate in the same space, permitting a smaller combustion chamber to be used.

To realize the utmost value from the constant compression feature of my engine it is necessary to vary the stroke over as great a range as possible. The governing factor is the minimum size of the combustion chamber at minimum stroke that it is practical to provide, considering the size of the intake valve, amount of valve lift and size of transfer passage necessary for proper breathing of the cylinders at full stroke. For an engine of 239 cu. in. displacement, 90 H. P. such as the engine that I have built and that is herein disclosed as a preferred embodiment of the invention, it is possible, with my specially designed combustion chamber, to vary the stroke 60%, that is, from 40% to 100% of full stroke, as above mentioned. By a further refinement of the combustion chamber and valve ports it is possible to somewhat increase the percentage of stroke variation. Thus, by using a smaller intake valve, and (or) less valve lift, thus sacrificing some performance at full stroke, approximately 75% variation in stroke is obtainable without departing from my principle of construction. Since the area of the intake port increases as the square of the diameter, and the orifice flow coefficient increases as the port size increases, less difficulty will be experienced in obtaining satisfactory variation in the stroke for larger size engines having a single intake valve. On the other hand, if two intake valves are necessary, because of the large size of the engine, the space required for the valves would probably be a critical item.

From the above explanation it will be understood that for the best results the combustion chamber of the constant compression engine should be as small as possible; also that the most critical items in the development of a compact combustion chamber are the space required for operating the valves and the size of the "transfer passage."

To eliminate transfer passage restriction opposed valves are located at right angles to the centerline of the cylinders in a position midway between the opposed cylinders. The intake is connected to the cylinders by two adequate size transfer passages, broached in a straight line between the cylinders. Bosses are located on the piston heads in such a manner that they nearly fill the transfer passages when the pistons are on top dead center at minimum stroke. Thus the minimum combustion chamber volume obtained is little more than the space required for the valves to operate in.

The combustion chamber design, just described in general terms, is shown in detail in Figs. 10 to 15, inclusive.

Between each two opposed cylinders 40, 40, provided with water jackets 51, are the inlet valve casing 52, having the fuel intake port 53, and the exhaust valve cage 56 having the exhaust outlet 57. Opposed exhaust and inlet valves, 54 and 58 respectively, are located, as above stated, at right angles to the center line of the opposed cylinders midway between them. The valves 54 and 58 are normally held closed by their respective springs 55 and 59. The cross-sectional area and shape of the transfer passage is shown clearly in Fig. 13, as indicated by the reference numeral 62.

Figure 15:
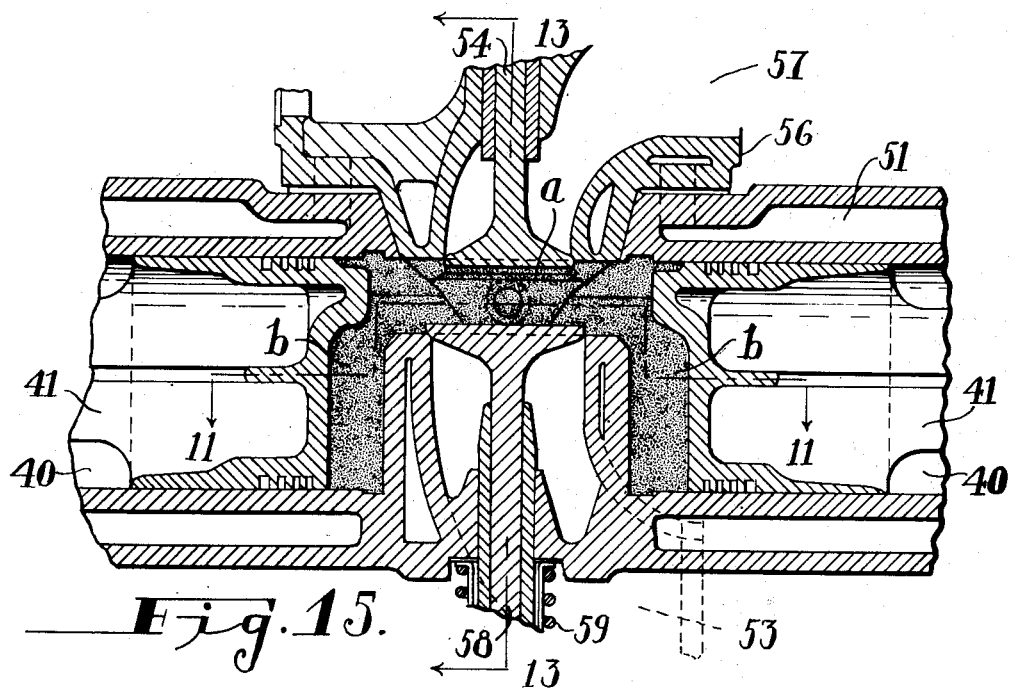
Fig. 15 is a view, similar to Fig. 14, of the combustion chamber, piston and associated parts when the piston is at the inner end of its longest stroke.
Figure 13:
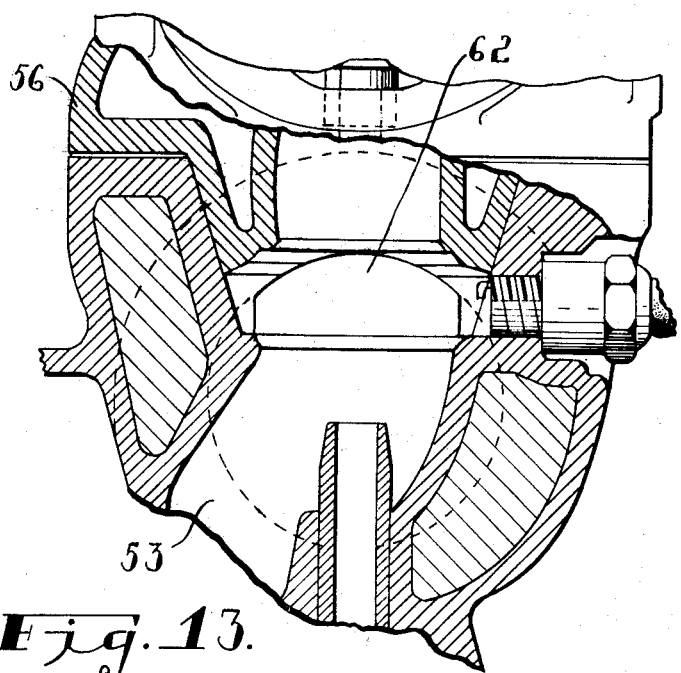
Fig. 13 is a section taken on the line 13—13 of Fig. 15 (with both valves removed), showing the shape and area of the transfer passage.
Figure 14:
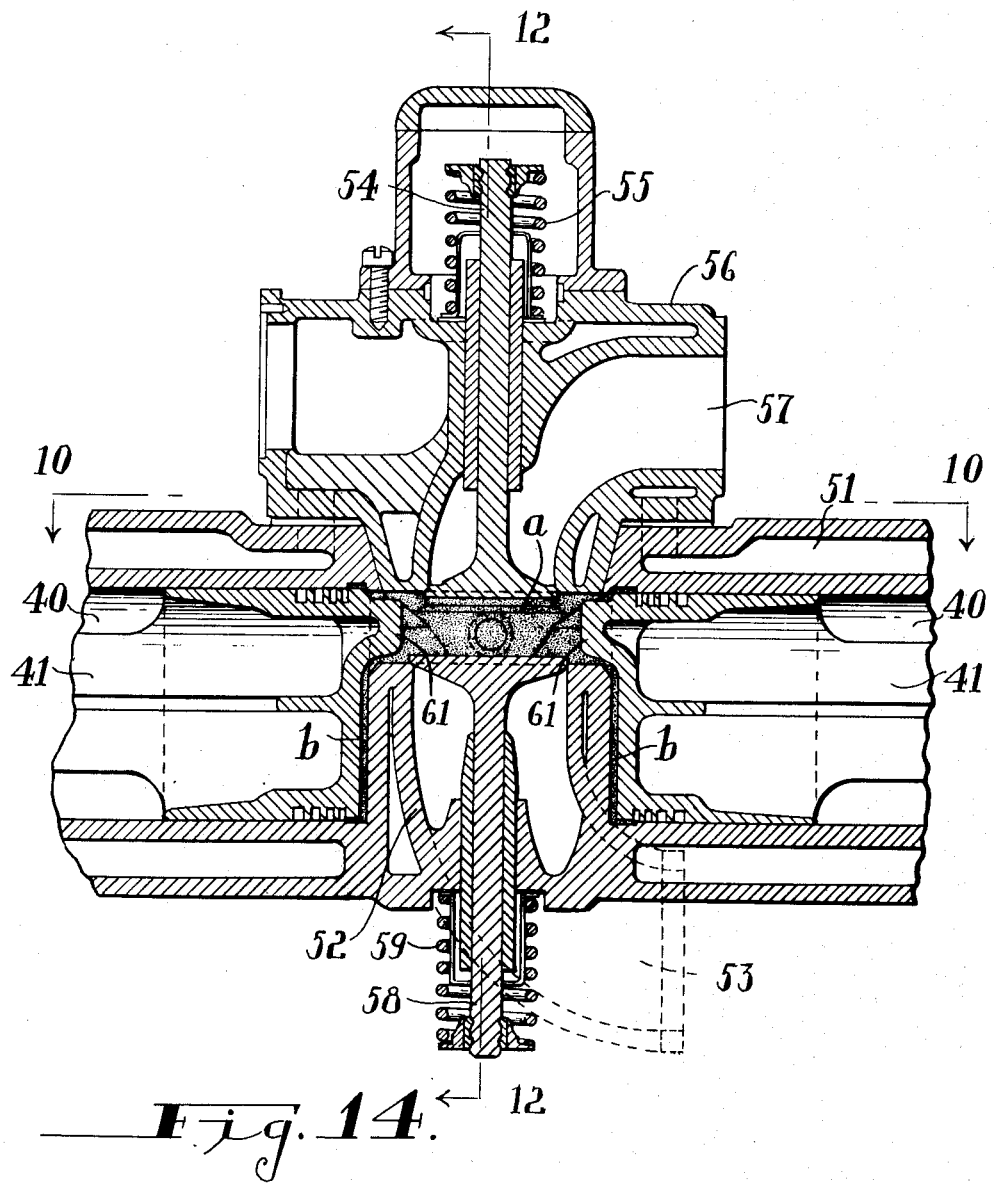
Fig. 14 is a side elevation section of the combustion chamber, piston and associated parts, showing the shape of the combustion chamber at the inner end of its shortest stroke.

Referring more particularly to Figs. 14 and 15, it will be observed that one portion $a$ of the combustion chamber is of narrow width, measured at right angles to the axis of the cylinders and pistons, relative to their diameters, and is offset relative to such axis, while another part $b$ thereof is enclosed by the inner end wall of the cylinders and the end faces of the pistons. The pistons are provided with bosses 61 aligning with the portion $a$ of the combustion chamber. By means of this construction it is possible to obtain a relatively small combustion chamber with a transfer passage of ample size and with adequate space for the valves. It is calculated that, given cylinders of a diameter of 2.6 inches and pistons having a stroke varying from a maximum of 4.5 inches to a minimum of 1.8 inches, the maximum volume of the combustion chamber should be 8.688 cubic inches when the pistons, having their 100% length of stroke, are at the ends of their instroke, and should be 3.475 cubic inches when the pistons having their 40% length of stroke are at the ends of their instroke. The just specified variation in volume of combustion chamber will be clear from an inspection of Figs. 14 and 15. It will be understood that the values above given for combustion chamber volume are merely illustrative and will vary with diameters of cylinders and maximum and minimum lengths of piston stroke; but the described combustion chamber construction is one that makes it possible to maintain substantially constant compression ratio over a relatively wide range of stroke variation, thus utilizing the previously described wobbler control mechanism to the best advantage.

It will be understood that while I have described means to maintain a constant compression ratio, it is only necessary, in order to secure a close approach to the advantage of my invention, that the compression ratio should be substantially constant. Indeed, a slight departure from an absolutely constant compression ratio at some percentage of maximum stroke may be desirable to obtain optimum cylinder output and detonation control. By varying the slope and/or contour of the guides 8 on the saddle 9, the compression ratio for any percentage of maximum stroke may be varied at will. The object of my invention, to repeat what is stated at the outset of this description, is to avoid the great drop in compression ratio when the engine is operated substantially below its maximum load that characterizes the conventional internal combustion engine; and this end is attainable by so designing the engine that the compression ratio will be maintained approximately constant.

This application is a continuation-in-part of applications filed by me May 24, 1945, Serial Numbers 595,592, and 595,593, now Patents 2,465,638 and 2,513,083.

What I claim and desire to protect by Letters Patent is:

1. In an internal combustion engine comprising a rotatable engine shaft, two sets of opposed cylinders disposed about said shaft and having their axes parallel thereto, wobbler elements toward opposite ends of and non-rotatable with the shaft, one for each set of cylinders, members toward opposite ends of and rotatable with the shaft and in their rotation imparting movement to the wobbler elements, and pistons reciprocatory in said cylinders and operatively connected with said wobbler elements; the improvement which comprises control devices connected with said wobbler elements and operable to simultaneously slide them in opposite directions equal distances along the shaft, saddles on the shaft, one for each wobbler element, each saddle having a pair of sloping guide rails, a pair of arms on each wobbler element engaging the guide rails of the corresponding saddle, the movement of said wobbler elements along the shaft in opposite directions thereby changing the angles of inclination of the wobbler elements relative to the shaft.

2. In an internal combustion engine comprising a rotatable engine shaft, two sets of opposed cylinders disposed about said shaft and having their axes parallel thereto, wobbler elements toward opposite ends of and non-rotatable with the shaft, one for each set of cylinders, members toward opposite ends of and rotatable with the shaft and in their rotation imparting movement to the wobbler elements, and pistons reciprocatory in said cylinders and operatively connected with said wobbler elements; the improvement in which the engine shaft is hollow and which comprises two control rods within and extending longitudinally of said shaft, means to shift said rods simultaneously equal distances in opposite directions, connections between said rods and the two wobbler elements respectively adapted, when said control rods are operated as described, to slide said wobbler elements in opposite directions along the shaft, and guide means engageable by said wobbler elements to change the angle of the wobbler elements relative to the shaft in their sliding movement along the shaft.

3. In an internal combustion engine comprising a rotatable engine shaft, two sets of opposed cylinders disposed about said shaft and having their axes parallel thereto, wobbler elements toward opposite ends of and non-rotatable with the shaft, one for each set of cylinders, members toward opposite ends of and rotatable with the shaft and in their rotation imparting movement to the wobbler elements, and pistons reciprocatory in said cylinders and operatively connected with said wobbler elements; the improvement in which the engine shaft is hollow and which comprises two control rods within and extending longitudinally of said shaft, means to shift said rods simultaneously equal distances in opposite directions, two sleeves slidable on said shaft, pivotal connections between the wobbler elements and the respective sleeves, interengaging devices, between each rod and the corresponding sleeve, whereby the said movements of the control rods in opposite directions slide said sleeves in opposite directions along the shaft, and guide means engageable by said wobbler elements in said sliding movements of said sleeves to change the angle of the wobbler elements relative to the shaft.

4. In an internal combustion engine comprising a rotatable engine shaft, two sets of opposed cylinders disposed about said shaft and having their axes parallel thereto, wobbler elements toward opposite ends of and non-rotatable with the shaft, one for each set of cylinders, members toward opposite ends of and rotatable with the shaft and in their rotation imparting movement to the wobbler elements, and pistons reciprocatory in said cylinders and operatively connected with said wobbler elements; the improvement which comprises two control rods slidable within the engine shaft, means to slide said control rods simultaneously equal distances in opposite directions, sleeves, one for each control rod, slidable along the engine shaft, trunnions on the respective sleeves on which said wobbler elements are mounted, saddles, one for each wobbler element, on the engine shaft, guide rails on each saddle, arms on each wobbler element, sliding blocks on said arms engaging the guide rails on the corresponding guide saddle, and pins, extending through longitudinal slots in said shaft, connecting the sleeves with the respective control rod, whereby when said control rods are slidable in opposite directions the said sleeves and the wobbler elements will be moved longitudinally of the shaft and at the same time change the angle of inclination of the wobbler elements relative to the axis of the shaft to thereby predetermine the length of stroke of the pistons.

SAMUEL B. ECKERT.

References Cited in the file of this patent

UNITED STATES PATENTS

| Number | Name | Date |
|---|---|---|
| 1,346,672 | Patton | July 13, 1920 |
| 1,355,484 | Lleo et al. | Oct. 12, 1920 |
| 1,479,918 | Lleo et al. | Jan. 8, 1924 |
| 1,486,583 | Huskisson | Mar. 11, 1924 |
| 1,825,691 | Hall | Oct. 6, 1931 |
| 2,133,842 | Bailey | Oct. 18, 1938 |
| 2,227,736 | Olson | Jan. 7, 1941 |
| 2,263,561 | Biermann | Nov. 25, 1941 |
| 2,320,928 | Henson | June 1, 1943 |
| 2,354,620 | Smith | July 25, 1944 |
| 2,465,638 | Eckert | Mar. 29, 1949 |